United States Patent [19]

Horiuchi et al.

[11] Patent Number: 4,716,133

[45] Date of Patent: Dec. 29, 1987

[54] METHOD FOR PRODUCTION OF SILICON NITRIDE SINTERED BODY

[75] Inventors: Akito Horiuchi, Kokubu; Kiyoshi Yokoyama, Kagoshima; Makoto Yoshida, Kokubu, all of Japan

[73] Assignee: Kyocera Corporation, Kyoto, Japan

[21] Appl. No.: 846,701

[22] Filed: Mar. 31, 1986

[51] Int. Cl.$^4$ .............................................. C04B 35/58
[52] U.S. Cl. ........................................ 501/97; 75/244; 419/23; 419/38; 419/44; 419/54; 419/57; 423/409; 501/98
[58] Field of Search .............. 419/38, 44, 54, 57, 419/23; 423/409; 501/97, 98; 156/DIG. 99; 75/244

[56] References Cited

U.S. PATENT DOCUMENTS

| | | | |
|---|---|---|---|
| 4,240,831 | 12/1980 | Ro et al. | 419/35 |
| 4,322,257 | 3/1982 | Menth et al. | 419/41 |
| 4,350,529 | 9/1982 | Ro et al. | 419/11 |
| 4,365,022 | 12/1982 | Tabata et al. | 501/98 |
| 4,401,617 | 8/1983 | Ezis et al. | 501/98 |
| 4,434,238 | 2/1984 | Ezis et al. | 501/98 |
| 4,568,516 | 2/1986 | Adlerborn et al. | 419/57 |

*Primary Examiner*—Stephen J. Lechert, Jr.
*Attorney, Agent, or Firm*—Spensley Horn Jubas & Lubitz

[57] ABSTRACT

When a composite nitride obtained by nitriding a fine powder of an alloy comprising metallic silicon and a metal of the group IIIa of the Periodic Table is sintered, a highly homogeneous silicon nitride sintered body having a high strength can be obtained. This fine powder of the alloy and this composite nitride exert a function of promoting sintering of $Si_3N_4$.

18 Claims, No Drawings

METHOD FOR PRODUCTION OF SILICON NITRIDE SINTERED BODY

BACKGROUND OF THE INVENTION (1) Field of the Invention

The present invention relates to a method for the production of a silicon nitride sintered body. More particularly, the present invention relates to a method for the production of a homogeneous silicon nitride sintered body having a high strength. Moreover, the present invention relates to a silicon nitride-containing composite nitride composition excellent in the sintering property.

(2) Description of the Prior Art

Since a silicon nitride sintered body is characterized in that most of linkages of atoms are covalent bonds, it is expected that the silicon nitride sintered body will be effectively used as a high-strength heat-resistant member, a highly corrosion-resistant member and a member showing a high strength at high temperatures.

As is well-known, in a silicon nitride sintered body, liquid phase sintering is effected by addition of a sintering aid to cause densification. As the sintering aid, there are used alkaline earth metal oxides such as MgO, rare earth metal oxides such as $Y_2O_3$, and such oxides as $Al_2O_3$. The sintering aid and silicon nitride powder are pulverized and mixed, and the resulting mixture is used as a starting material for a silicon nitride sintered body.

The oxide type additive reacts with silicon nitride or a film of $SiO_2$ present on the surface of the crystal of silicon nitride powder to form a grain boundary phase, and even if the starting material is sufficiently pulverized and mixed, microscopically uniform distribution cannot be obtained but the size of this grain boundary phase is not uniform, with the result that abnormal growth of sintered grains of silicon nitride is promoted and the formed grain boundary having a large thickness acts as a breaking source. Furthermore, the ion bonding property is increased by addition of the oxide and inherent excellent characteristics of silicon nitride are degraded. Accordingly, in order to improve characteristics of the sintered body, especially mechanical characteristics, it is necessary that a non-oxide type sintering aid should be used and the sintering aid should be uniformly dispersed while reducing the amount added of the sintering aid.

As means for uniformly dispersing a sintering aid, there is ordinarily adopted a method in which the particle size of the starting powder is reduced as much as possible and the dispersion efficiency is increased by using ultra-fine powder. However, if starting powder having such an ultra-fine size is molded, the density of the molded body, that is, the bulk density of a compacted powder body, tends to decrease, and such troubles as reduction of the sintering property, increase of the amount of contraction and degradation of the size precision arise.

SUMMARY OF THE INVENTION

We found that in a composite nitride obtained by nitriding a fine powder of an alloy containing metallic silicon and a metal of the group IIIa of the Periodic Table in a nitrogen atmosphere, the silicon component and the component of the metal of the group IIIa are present in a very homogeneous stage, and that if this composite nitride is sintered, a silicon nitride sintered body having a high strength at high temperatures can be obtained. It also was found that the above-mentioned fine alloy powder or the above-mentioned composite nitride promotes sintering of silicon nitride and the strength of the obtained sintered body is prominently improved.

It is therefore a primary object of the present invention to provide a method for the production of a highly homogeneous silicon nitride sintered body having an excellent strength at high temperatures.

Another object of the present invention is to provide a sintering method in which sintering can be carried out in a state where a component of a metal of the group IIIa is dispersed as a sintering aid homogeneously in order of the atomic size.

Still another object of the present invention is to provide a novel composite nitride which is advantageously used as a starting material for the production of a silicon nitride sintered body having a high strength at high temperatures.

In accordance with one fundamental aspect of the present invention, there is provided a method for the production of a silicon nitride sintered body, which comprises molding a fine powder of an alloy comprising metallic silicon and a metal of the group IIIa of the Periodic Table, subjecting the molded body to a nitriding treatment in a nitrogen-containing atmosphere and sintering the nitrided molded body at a temperature higher than the nitriding treatment temperature.

In accordance with another fundamental aspect of the present invention, there is provided a method for the production of a silicon nitride sintered body, which comprises calcining a fine powder of an alloy comprising metallic silicon and a metal of the group IIIa of the Periodic Table in a nitrogen-containing atmosphere to effect a nitriding treatment, molding the obtained nitride or a mixture of the obtained nitride and a sintering aid, and sintering the molded body at a temperature higher than the nitriding treatment temperature.

In accordance with still another aspect of the present invention, there is provided a method for the production of a silicon nitride sintered body, which comprises molding a composition comprising (a) 1 to 30% by weight of a fine powder of an alloy comprising metallic silicon and a metal of the group IIIa of the Periodic Table, (b) 70 to 99% by weight of a fine powder of silicon nitride and (c) up to 15% by weight of a sintering aid, and sintering the molded body in a nitrogen-containing atmosphere.

In accordance with still another aspect of the present invention, there is provided a method for the production of a silicon nitride sintered body, which comprises sintering a composition comprising (i) 1 to 30% by weight of a composite nitride obtained by calcining a powder of an alloy comprising metallic silicon and a metal of the group IIIa of the Periodic Table, (ii) 70 to 99% by weight of a fine powder of silicon nitride and (iii) up to 15% by weight of a sintering aid in a nitrogen-containing atmosphere.

In accordance with a further aspect of the present invention, there is provided a composite nitride which is composed mainly of $\alpha\text{-}Si_3N_4$ and in which Si and a metal of the group IIIa of the Periodic Table are present at a weight ratio of from 99.9/0.1 to 70/30, said composite nitride being obtained by nitriding a fine powder of an alloy containing metallic silicon and the metal of the group IIIa of the Periodic Table at said weight ratio in a nitrogen atmosphere.

DETAILED DESCRIPTION OF THE PREFERRED EMBODIMENTS COMPOSITE NITRIDE AND METHOD FOR PRODUCTION THEREOF

As the method for preparing a starting powder for a silicon nitride sintered body, there are known a method of direct nitriding of silicon, a method of reduction of silica, a gas phase synthesis method and a thermal decomposition method. The method of direct nitriding of silicon is most frequently adopted on an industrial scale. According to this method, a powder of metallic silicon and nitrogen gas are used and synthesis reaction of $3Si + 2N_2 \rightarrow Si_3N_4$ is carried out. The reaction is simple and the preparation steps are relatively simple.

In the present invention, it is important that in this method of direct nitriding of silicon, a metal element of the group IIIa of the Periodic Table, which should act as a sintering aid for a silicon nitride sintered body, should be incorporated in metallic silicon. This can be accomplished by subjecting a metal powder obtained by pulverizing an alloy comprising metallic silicon and a metal element of the group IIa of the Periodic Table to the synthesis reaction according to the known direct nitriding method.

This reaction is advanced as expressed by the following formula:

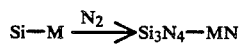

$$Si-M \xrightarrow{N_2} Si_3N_4-MN$$

wherein M stands for a metal of the group IIIa of the Periodic Table.

When the metal powder reacts directly with nitrogen gas, generation of heat is vigorous. Accordingly, a technique of controlling the reaction is required. For example, there is mainly adopted a method in which the heating rate is controlled in the co-presence of hydrogen gas or ammonia gas with nitrogen gas and the synthesis is carried out while controlling the reaction temperature to 1300° to 1400° C.

By introducing a pulverizing step after the synthesis reaction, a composite nitride valuable as the starting material powder for a silicon nitride sintered body is obtained.

If the temperature of the nitriding reaction is within the above-mentioned range, a composite nitride composed mainly of $\alpha$-$Si_3N_4$ is formed, but if the nitriding temperature is higher than the above range, a composite nitride composed mainly of $\beta$-$Si_3N_4$ is obtained.

In the present invention, as the metal atom of the group IIIa of the Periodic Table, there are preferably used rare earth elements such as Sc, Y, La, Ce, Pr, Nd, Pm, Sm, Eu, Gd, Tb, Dy, Ho, Er, Tm, Yb, Lu and combinations thereof.

The ratio of metallic silicon to the metal of the group IIIa of the Periodic Table in the alloy can be changed in a broad range. For example, when this composite nitride is used as the main sintering agent, it is preferred that the ratio of the metallic silicon powder to the metal of the group IIIa of the Periodic Table be from 99.9/0.1 to 70/30, especially from 99.5/0.5 to 90/10. If the amount of the metal of the group IIIa is too small and below the above-mentioned range, it is difficult to uniformly disperse the sintering aid in an effective amount. If the metal of the group IIIa is too large and exceeds the above-mentioned range, excellent properties of the silicon nitride sintered body are lost.

When the alloy powder or composite nitride is used for promoting sintering of $Si_3N_4$ in accordance with another embodiment of the present invention, it is preferred that the weight ratio of Si to the metal of the group IIIa be from 1/10 to 10/1, especially from 1/5 to 10/1, especially particularly from 10/4 to 10/1. If the amount of the metal of the group IIIa is too large and exceeds the above range, the powder of the metal of the group IIIa is easily oxidized and handling becomes difficult. On the other hand, if the amount of Si is too large and exceeds the above range, no substantial effect is attained by addition of the metal of the group IIIa and advance of sintering becomes difficult.

The alloy is prepared by mixing a powder of metallic silicon with a powder of a metal of the group IIIa and heating and melting the mixture at a temperature of 1400° to 1600° C. The obtained alloy is pulverized by a pulverizer such as a ball mill to obtain a fine powder having an average particle size of 0.5 to 10 $\mu$m.

The composite nitride obtained by the nitriding reaction is finely pulverized, if necessary, and is used for the next step.

The composite nitride used for the production of a silicon nitride sintered body in the present invention is composed mainly of $\alpha$-$Si_3N_4$, and it contains metallic silicon and the metal of the group IIIa at the above-mentioned ratio calculated at the elements.

As is apparent from examples given hereinafter, the metal of the group IIIa is dispersed substantially as the atom in the silicon atom, and the composite nitride contains lattice defects. Accordingly, it is considered that if sintering is carried out by using this starting powder, internal energy makes a contribution to promotion of sintering and the diffusion is activated to produce an easily sintering state, with the result that a silicon nitride sintered body having a high strength and a high denseness can be advantageously provided.

In the composite nitride of the present invention, the relative scattering intensity of MN (nitride of the metal of the group IIIa) is lower than that of MN observed in a mere mixture of $Si_3N_4$ and MN. Accordingly, it is considered that the respective components are present in a state different from the state of the mixture. For example, it is presumed that the starting powder for silicon nitride, obtained by alloying metallic silicon with Y and nitriding the alloy, contains a linkage of Si-N-Y or Si-Y-N.

SINTERING METHOD 1

According to the present invention, the composite nitride obtained by the above-mentioned method or a mixture of the composite nitride and a sintering aid is molded, and the molded body is sintered at a temperature higher than the nitriding treatment temperature.

Known sintering aids such as $Al_2O_3$, $Y_2O_3$, MgO, SrO, AlN, YN and $B_4C$ may be used singly or in the form of a mixture of two or more of them. The sintering aid may be used in an amount of up to 15% by weight, especially up to 10% by weight, if desired.

Molding and sintering may be carried out sequentially in this order or simultaneously. Molding is accomplished according to a known method, for example, a press molding method using a mold, a cast molding method, an injection molding method of an extrusion molding method. Sintering of the molded body can be carried out at a temperature higher than 1650° C., preferably 1750° to 2100° C., for 1 to 10 hours. In order to effect molding and sintering simultaneously, sintering may be carried out at the above-mentioned temperature by hot pressing or hot isostatic pressing (HIP). It is preferred that sintering be carried out in a nitrogen atmosphere.

SINTERING METHOD 2

In accordance with another embodiment of the present invention, the powdery alloy comprising metallic silicon and the metal of the group IIIa, obtained according to the above-mentioned method, is molded, and the molded body is subjected to a nitriding treatment in a nitrogen-containing atmosphere and the nitrided molded body is sintered at a temperature higher than the nitriding treatment temperature. Preferably, after the nitriding reaction, the temperature is elevated and sintering is carried out in situ. This sintering method is advantageous in various points over the conventional sintering methods.

Defects as pointed out hereinbefore are brought about if an oxide is used as the sintering aid. A nitride REN (wherein RE stands for a metal of the group IIIa of the Periodic Table) has a very high reactivity with oxygen or water and the nitride is easily converted to an oxide during handling. Accordingly, use of such a nitride fails to completely obviate the defects brought about by the use of an oxide type sintering aid.

According to the present embodiment, by alloying metallic silicon with a metal of the group IIIa, the stability against oxygen or water vapor is highly improved as compared with the case where both the metals are separately present, and furthermore, the dispersibility of the metal of the group IIIa into metallic silicon is improved. Therefore, formation of the starting composition into an ultra-fine powder becomes unnecessary when the starting composition is molded, and reduction of the bulk density of a compacted powder body can be moderated and there can be attained an effect of rendering the molded body homogeneous and, in turn, rendering the sintered body homogeneous.

Moreover, by molding the fine powder of the alloy, subjecting the molded body to the nitriding treatment and sintering the nitrided molded body, $Si_3N_4$ or REN is prevented from falling in contact with oxygen in air or water vapor, and a sintered body having a very low oxygen content, ordinarily an oxygen content lower than 2% by weight based on the total sintered body, can be obtained. The oxygen content in the silicon nitride sintered body can be determined according to a known method such as a radiochemical analysis method.

In this embodiment of the present invention, the nitriding treatment can be carried out under conditions described hereinbefore with respect to the composite nitride. The sintering conditions may be the same as those adopted in the sintering method 1.

SINTERING METHOD 3

In accordance with still another embodiment of the present invention, a composition comprising (a) 1 to 30% by weight, especially 5 to 20% by weight, of a fine powder of an alloy comprising metallic silicon and a metal of the group IIIa fo the Periodic Table, (b) 70 to 99% by weight, especially 80 to 95% by weight, of a fine powder of silicon nitride and (c) up to 15% by weight, especially up to 10% by weight, of a sintering aid is molded, and the molded body is sintered in a nitrogen-containing atmosphere.

Sintering may be carried out at a temperature higher than 1700° C. in one stage, but it is preferred that the first stage of sintering be carried out at a temperature of 1300° to 1400° C. to effect a nitriding treatment of the alloy, the temperature be elevated to a level exceeding 1700° C. and the second stage of sintering be carried out.

According to this sintering method, by using a powder of an alloy comprising Si and a metal of the group IIIa at a specific weight ratio as the additive to the fine powder of silicon nitride, the density of the molded body can be improved even if silicon nitride in the form of a fine powder is used, and therefore, the size precision can be improved and sintering can be activated.

It is preferred that the alloy of Si and the metal of the group IIIa be incorporated in an amount of 1 to 30% by weight, especially 5 to 20% by weight, in the starting powder. If the amount of the alloy is smaller than 1% by weight, no substantial effect of improving the sintering property cannot be attained, and if the amount of the alloy is larger than 30% by weight, complete nitriding of the alloy becomes difficult and the strength is easily reduced. Incidentally, $\alpha$-$Si_3N_4$, which has the easily sintering property, is advantageously used as the starting silicon nitride.

Other sintering aid as described above with respect to the sintering method 1 may be incorporated at the above-mentioned weight ratio, though incorporation of the sintering aid is ordinarily unnecessary.

The powdery alloy prepared according to the above-mentioned method may be used as the alloy in this embodiment of the present invention. Furthermore, molding can be performed according to the same molding method as described above with respect to the sintering method 1.

This embodiment of the present invention is characterized in that sintering is accomplished in a short time and decomposition of the nitride of the metal of the group IIIa can be controlled as in the sintering method 2. For example, 10 hours or scores of hours are necessary for converting metallic silicon or its alloy to a nitride. On the other hand, in this embodiment, the conversion can be accomplished within 1 to 5 hours, if necessary in an atmosphere of $N_2$, at a temperature higher than 1700° C. while controlling decomposition of silicon nitride, as in ordinary sintering of silicon nitride.

As another method, there can be mentioned a method in which the molded body is maintained for a certain time at a temperature of 1300° to 1400° C. where nitriding reaction of the alloy of Si and the metal of the group IIIa is advanced, and after completion of the nitriding reaction, sintering is carried out at a temperature higher than 1700° C.

SINTERING METHOD 4

In accordance with still another embodiment of the present invention, a composition comprising (i) 1 to 30% by weight, especially 2 to 30% by weight, of a composite nitride formed by calcining a powder of an alloy comprising metallic silicon and a metal of the group IIIa fo the Periodic Table in a nitrogen-containing atmosphere, (ii) 70 to 99% by weight, especially 70 to 98% by weight, of a fine powder of silicon nitride and (iii) up to 15% by weight, especially up to 10% by weight, of a sintering aid is sintered in a nitrogen-containing atmosphere.

In this embodiment of the present invention, by using a composite nitride obtained by a nitriding treatment of an alloy comprising metallic silicon and a metal of the group IIIa of the Periodic Table for the treatment of silicon nitride, the sintering property can be improved, and the density or strength of the obtained sintered body can be improved.

As the composite nitride, silicon nitride and the sintering aid as an optional component, there may be used those described hereinbefore, and molding and sintering may be carried out according to the same methods under the same conditions as described above.

In accordance with the present invention, the sintering property of silicon nitride can be highly improved, and a homogeneous silicon nitride body which is excellent in the strength, especially the strength at high temperatures, can be obtained and this is especially valuable as a construction material to be used at high temperatures.

The present invention will now be described in detail with reference to the following examples that by no means limit the scope of the invention.

EXAMPLE 1

The obtained starting powder for silicon nitride was analyzed by the X-ray diffractometry. The obtained results are shown in Table 1.

Incidentally, the composition of the starting powder, shown in Table 1, was determined in the following manner.

X-ray peak heights of $\alpha$-$Si_3N_4$(201) and $\beta$-$Si_3N_4$(101) and maximum X-ray peak heights of the rare earth metal nitride and other component were measured, and among these peak heights, the maximum value was designated as 100 and relative values of the remaining three components were determined and expressed in three stages. Accordingly, the maximum X-ray peak height is 100 and indicated by mark "⊚". An X-ray peak height having a relative value of 10 to 30 is indicated by mark "⊙" and an X-ray peak height having a relative value smaller than 10 is indicated by mark "X". With respect to each starting powder, the experiment was conducted several times and the mean value was calculated. The deviation was within a range of ±15%.

TABLE 1

| Starting Powder | Composition (% by weight) of Alloy | | Temperature (°C.) for Reaction with Nitrogen Gas | Composition of Starting Powder | | | | |
|---|---|---|---|---|---|---|---|---|
| | Silicon (Si) | Rare Earth Metal | | $\alpha$-$Si_3N_4$ | $\beta$-$Si_3N_4$ | Rare Earth Metal Nitride | Residual Si (% by weight) | Other Component |
| a | 90 | 10(Y) | 1350 | ⊚ | X | O | ~1.2 | O |
| b | 95 | 5(Yb) | 1400 | ⊚ | O | O | <0.3 | O |
| c | 90 | 10(La) | 1400 | ⊚ | O | O | <0.3 | O |
| d | 80 | 20(SeH) | 1450 | ⊚ | O | O | <0.3 | O |
| e | 70 | 30(Ce) | 1400 | ⊙ | O | O | <0.3 | O |
| f | 80 | 10(Y) 5(Nd) 5(Yb) | 1300 | ⊚ | O | O | <0.3 | O |
| g | 95 | 5(Y) | 1500 | O | ⊚ | O | <0.3 | O |
| h | 95 | 5(Sm) | 1250 | ⊚ | X | O | ~15 | O |

A powder of metallic silicon was mixed with a powder of a rare earth metal at a weight ratio shown in Table 1, and the mixture was molten at a temperature of 1400° to 1600° C. to obtain an alloy. The alloy was pulverized to an average particle size of about 2 μm according to a known method using a ball mill. The powdered alloy was subjected to nitriding reaction in a nitrogen gas atmosphere at a maximum temperature of 1250° to 1500° C. and the amount of residual silicon was reduced to a level as low as possible. The obtained mass was roughly pulverized and then finely pulverized to adjust an average particle size to less than 1 μm.

The silicon nitride powder shown in Table 1 was used as the starting material, optionally together with a sintering aid, and treated for 24 hours in a ball mill.

The obtained slurry was dried and granulated and was then press-molded. After removal of the binder, a sintered body was prepared in a nitrogen gas atmosphere under sintering conditions shown in Table 2.

The flexural strength and relative density of the obtained sintered body were measured. The obtained results are shown in Table 2.

The flexural strength was determined with respect to a specimen having a size of 4 mm×3 mm×42 mm according to the 4-point bending method of JIS R-1601.

TABLE 2

| Sample | Kind and Composition (% by weight) of Starting Material | Sintering Conditions | | | High-Temperature Strength (1300° C.) (kg/mm²) | Relative Density (%) |
|---|---|---|---|---|---|---|
| | | Temperature (°C.) | Time (hours) | Pressure (atmospheres) of $N_2$ Gas Atmosphere | | |
| 1 | powder a (100) | 1950 | 2 | 9.8 | 95.6 | 99.2 |
| 2 | powder b (100) | 2000 | 2 | 20 | 88.3 | 98.3 |
| 3 | powder d (100) | 1850 | 3 | 9.8 | 95.1 | 96.9 |
| 4 | powder a (95) + $Al_2O_3$ (5) | 1750 | 3 | 1 | 60.7 | 98.4 |
| 5 | powder c (99.9) + MgO (0.1) | 1780 | 3 | 1 | 85.0 | 99.2 |
| 6 | powder e (95) + SrO (5) | 1650 | 2 | 1 | 92.5 | 99.8 |
| 7 | powder f (98) + AlN (2) | 1850 | 2 | 1 | 88.6 | 99.6 |
| 8 | powder h (95) + SrO (2) + $SiO_2$ (3) | 2000 | 2 | 20 | 97.4 | 99.4 |
| 9* | $Si_3N_4$ (90) + $Y_2O_3$ (5) + $Al_2O_3$ (5) | 1750 | 3 | 1 | 35.0 | 96.1 |
| 10* | $Si_3N_4$ (90) + YN (10) | 1950 | 2 | 9.5 | 42.1 | 92.1 |
| 11* | $Si_3N_4$ (90) + $Sm_2O_3$ (5) + | 2000 | 3 | 20 | 58.3 | 89.0 |

TABLE 2-continued

| Sample | Kind and Composition (% by weight) of Starting Material | Sintering Conditions Temperature (°C.) | Time (hours) | Pressure (atmospheres) of $N_2$ Gas Atmosphere | High-Temperature Strength (1300° C.) (kg/mm$^2$) | Relative Density (%) |
| --- | --- | --- | --- | --- | --- | --- |
| | SrO (2) + SiO$_2$ (3) | | | | | |

Note
*outside the scope of the present invention

The following can be seen from the data shown in Table 2.

Samples Nos. 1 through 8 of the present invention are excellent in the high-temperature strength characteristic and have a density close to the theoretical density. Samples Nos. 9, 10 and 11 are comparative samples corresponding to samples Nos. 4, 1 and 8 of the present invention, respectively. That is, the kind and mixing ratio of the sintering aid are identical in the two corresponding samples. The high-temperature strength of each of samples Nos. 4, 1 and 8 is about 2 times as high as that of the corresponding comparative sample. Although samples Nos. 1 and 10 were obtained under the same sintering conditions, sample No. 1 was superior to sample No. 10. This indicates that powder a is excellent in the easy sintering property.

EXAMPLE 2

A powder of metallic silicon was mixed with a powder of a rare earth metal at a ratio shown in Table 3, and the mixture was molten at a temperature of 1400° to 1600° C. to obtain an alloy. The alloy was pulverized to an average particle size of about 2 μm according to a known method using a ball mill or the like to obtain a finely divided alloy shown in Table 3.

Other additive was added to the obtained fine powder at a ratio shown in Table 3 to obtain a starting powder.

The starting powder was sintered under conditions shown in Table 3 to obtain a sintered body.

With respect to each of the so-obtained sintered bodies, the specific gravity was measured according to the Archimedes method and the flexural strength was measured according to the 4-point bending method of JIS R-1601 (specimens having a size of 4 mm×3 mm×42 mm).

From the measurement results, it was found that the content of residual Si was very low and the specific gravity and strength of the obtained sintered body were excellent.

COMPARATIVE EXAMPLE 1

Y$_2$O$_3$, Al$_2$O$_3$ or YN was incorporated in a fine powder of silicon nitride at a ratio shown in Table 3, and the mixture was sintered under sintering conditions shown in Table 3. Thus, sintered bodies of samples Nos. 4, 5 and 6 shown in Table 3 were obtained. The properties of these sintered bodies were measured in the same manner as described in Example 2.

From the results shown in Table 3, it is seen that these comparative sintered bodies were inferior in the specific gravity and strength to the sintered bodies obtained in Example 2 according to the present invention.

TABLE 3

| Sample No. | Composition (% by weight) of Starting Material | | | Nitriding Temperature (°C.) | Nitriding Time (hours) | Sintering Temperature (°C.) | Sintering Time (hours) | Atmosphere | Pressure (atmosphere) | Specific Gravity | Strength (kg/mm$^2$) |
| --- | --- | --- | --- | --- | --- | --- | --- | --- | --- | --- | --- |
| | Si | IIIa | Other Additive | | | | | | | | |
| 1 | 85 | 10Y | 5 AlN | 1400 | 20 | 1780 | 5 | N$_2$ | 1 | 3.35 | 79 |
| 2 | 90 | 8Y | 2 Al$_2$O$_3$ | 1450 | 10 | 1850 | 2 | " | 2 | 3.33 | 80 |
| 3 | 95 | 5Y | — | 1380 | 38 | 1950 | 4 | " | 9.8 | 3.31 | 72 |
| 4* | 98 Si$_3$N$_4$ | — | 3 YN 2 Al$_2$O$_3$ | — | — | 1950 | 2 | " | 9.8 | 3.17 | 65 |
| 5* | 98 Si$_3$N$_4$ | — | 2 YN | — | — | 1970 | 2 | " | 9.8 | 3.15 | 69 |
| 6* | 98 Si$_3$N$_4$ | — | 2 Y$_2$O$_3$ | — | — | 1970 | 2 | " | 9.8 | 3.11 | 59 |
| 7 | 97 | 3Ce | — | 1400 | 20 | 1950 | 4 | " | 9.8 | 3.18 | 75 |
| 8 | 65 | 35Y | — | 1400 | 20 | 1850 | 2 | " | 2 | 3.58 | 31 |
| 9 | 95 | 5Sc | — | 1400 | 15 | 1950 | 2 | " | 9.8 | 3.25 | 85 |
| 10 | 97 | 3Yb | — | 1420 | 15 | 1950 | 2 | " | 9.8 | 3.21 | 78 |

Note
*outside the scope of the invention

EXAMPLE 3

An alloy of Si and a metal of the group IIIa shown in Table 4 and other additive shown in Table 4 were added in amounts shown in Table 4 to a fine powder of silicon nitride having a specific surface area of 15 m$^2$/g, and the mixture was pulverized by a vibro-mill containing balls of Si$_3$N$_4$ and was then molded. The molded body was sintered under sintering conditions shown in Table 4. Thus, silicon nitride sintered bodies of samples Nos. 1 through 7 shown in Table 4 were obtained.

Incidentally, the particle size of the alloy used was adjusted to 2 μm on the average by pulverization with a vibro-mill containing balls of Si$_3$N$_4$.

The other additive used had the average particle size adjusted to 1.0 μm.

With respect to each of the obtained sintered bodies, the specific gravity was measured by the Archimedes method and the flexural strength was determined according to the 4-point bending method of JIS R-1601 (specimens having a size of 4 mm×3 mm×30 mm).

As is apparent from the results shown in Table 4, each sintered body had high specific gravity and high strength.

COMPARATIVE EXAMPLE 2

The procedures of Example 3 were repeated in the same manner except that $Y_2O_3$, $Al_2O_3$ or $Sm_2O_3$ was incorporated in an amount shown in Table 4 to the powder of silicon nitride instead of the alloy of Si and the metal of the group IIIa. Thus, sintered bodies of samples Nos. 8 and 9 shown in Table 4 were obtained. The characteristics of these samples were measured in the same manner as described in Example 3. The obtained results are shown in Table 4.

From the results shown in Table 4, it is seen that these comparative samples were inferior in the specific gravity and strength to the sintered bodies obtained in Example 3 according to the present invention. When samples Nos. 1 and 8, analogous to each other in the composition and different only in that the Y compound of sample No. 1 was YN while the Y compound of sample No. 8 was $Y_2O_3$, were compared, it was found that sample No. 1 was apparently superior to sample No. 8 in both the specific gravity and the strength, though they were prepared under the same conditions.

average particle size to less than 1 μm. The composition is shown in Table 5.

The obtained nitride was mixed with $\alpha$-$Si_3N_4$ and other additive at a ratio shown in Table 5, and the mixture was pulverized by a vibro-mill containing balls of $Si_3N_4$ and was then molded. The molded body was sintered under sintering conditions shown in Table 5 to obtain a silicon nitride sintered body.

The average particle size of the other additive used was adjusted to 1.0 μm.

With respect to each of the obtained sintered bodies, the specific gravity was measured according to the Archimedes method and the flexural strength was measured according to the 4-point bending method of JIS R-1601 (specimens having a size of 4 mm×3 mm×42 mm).

From the measurement results shown in Table 5, each of the sintered bodies had a high specific gravity and a high strength.

COMPARATIVE EXAMPLE 3

The procedures of Example 4 were repeated in the

TABLE 4

| Sample No. | Composition (% by weight) | | | Sintering Conditions | | | | Characteristics | |
|---|---|---|---|---|---|---|---|---|---|
| | $Si_3N_4$ | Si—M (composition) | Other Additive | Temperature (°C.) | Time (hours) | Pressure (atmosphere) | Atmosphere | Specific Gravity | Strength (kg/mm²) |
| 1 | 70 | 30(70Si—30Y) | — | 1880 | 3 | 9.8 | $N_2$ | 3.2 | 85 |
| 2 | 80 | 20(60Si—40Sm) | — | 1880 | 3 | 9.8 | " | 3.2 | 77 |
| 3 | 90 | 10(50Si—25Ce—25La) | — | 1880 | 3 | 9.8 | " | 3.2 | 75 |
| 4 | 80 | 20(90Si—10Y) | — | 1990 | 2 | 9.8 | " | 3.15 | 65 |
| 5 | 95 | 5(10S—90Y) | — | 1970 | 2 | 20 | " | 3.15 | 85 |
| 6 | 80 | 15(60Si—40Sm) | $5Al_2O_3$ | 1780 | 5 | 1 | " | 3.27 | 79 |
| 7 | 80 | 15(70Si—30Y) | 5AlN | 1780 | 5 | 1 | " | 3.10 | 67 |
| 8* | 91 | — | $9Y_2O_3$ | 1880 | 3 | 9.8 | " | 3.18 | 59 |
| 9* | 89 | — | $6Sm_2O_3 \cdot 5Al_2O_3$ | 1780 | 5 | 1 | " | 3.14 | 54 |
| 10* | 99.2 | 0.8(70Si—30Y) | — | 2100 | 2 | 40 | " | 3.01 | 49 |
| 11* | 80 | 20(95Si—5Y) | — | 1980 | 3 | 20 | " | 3.02 | 41 |
| 12* | 80 | 20(5Si—95Y) | — | 1780 | 5 | 1 | " | 3.35 | 51 |
| 13* | 67 | 33(80Si—20Y) | — | 1880 | 3 | 9.8 | " | 3.08 | bleed-out of Si, 26 |
| 14 | 80 | 20(80Si—20Y) | — | 1780 | 5 | 1 | " | 3.30 | 65 |
| 15 | 90 | 10(90Si—10Y) | — | 1980 | 3 | 9.8 | " | 3.17 | 61 |

Note
*outside the scope of the invention

EXAMPLE 4

A powder of metallic silicon was mixed with a powder of a rare earth metal and the mixture was molten at a temperature of 1400° to 1600° C. to obtain alloy. The alloy was pulverized to an average particle size of about 2 μm according to a known method using a ball mill or the like. The powder was subjected to nitriding reaction in a nitrogen gas atmosphere at a maximum temperature of 1250° to 1450° C. to reduce the content of residual Si to a level as low as possible. The obtained mass was roughly pulverized and finely pulverized to adjust the same manner except that $Y_2O_3$, $Al_2O_3$ or YN having a particle size of 1.0 μm was used instead of the nitrided alloy of Si and the metal of the group IIIa. Thus, sintered bodies of samples Nos. 6 through 8 shown in Table 5 were obtained, and the characteristics were measured in the same manner as described in Example 4.

From the data shown in Table 5, it is seen that these comparative samples were inferior in the specific gravity and strength to the sintered bodies obtained in Example 4.

TABLE 5

| Sample No. | Composition (% by weight) of Starting Powder | | | Sintering Temperature (°C.) | Sintering Time (hours) | Pressure (atmosphere) | Atmosphere | Specific Gravity | Strength (kg/mm²) |
|---|---|---|---|---|---|---|---|---|---|
| | $Si_3N_4$ | $N_2$—Treated Si—IIIa Alloy | Other Additive | | | | | | |
| 1 | 85 | 10(80$Si_3N_4$—20YN) | 5 AlN | 1950 | 3 | 9.8 | $N_2$ | 3.16 | 93 |
| 2 | 85 | 13(80$SiN_4$—20YN) | 2 $Al_2O_3$ | 1950 | 3 | 9.8 | " | 3.24 | 101 |
| 3 | 60 | 38(80$Si_3N_4$—20YN) | 2 SrO | 1950 | 3 | 9.8 | " | 3.31 | 113 |
| 4 | 90 | 10(80$Si_3N_4$—20YN) | — | 1970 | 3 | 9.8 | " | 3.18 | 86 |
| 5 | 80 | 20(90$Si_3N_4$—10YN) | — | 1970 | 3 | 9.8 | " | 3.17 | 78 |
| 6* | 95 | — | $3YN \cdot 2Al_2O_3$ | 1950 | 3 | 9.8 | " | 3.17 | 65 |
| 7* | 98 | — | 2 YN | 1970 | 3 | 9.8 | " | 3.15 | 69 |
| 8* | 98 | — | 2 $Y_2O_3$ | 1970 | 3 | 9.8 | " | 3.11 | 59 |
| 9 | 80 | 19(80$Si_3N_4$—20SmN) | 1 $B_4C$ 3 $Al_2O_3$ | 1980 | 3 | 20 | " | 3.18 | 79 |

TABLE 5-continued

| Sample No. | Composition (% by weight) of Starting Powder | | | Sintering Temperature (°C.) | Sintering Time (hours) | Pressure (atmosphere) | Atmosphere | Specific Gravity | Strength (kg/mm$^2$) |
|---|---|---|---|---|---|---|---|---|---|
| | Si$_3$N$_4$ | N$_2$—Treated Si—IIIa Alloy | Other Additive | | | | | | |
| 10 | 80 | 15(80Si$_3$N$_4$—20SmN) | 2 AlN | 1780 | 5 | 1 | " | 3.11 | 75 |
| 11 | 85 | 15(70Si$_3$N$_4$—30ScN) | — | 1950 | 3 | 9.8 | " | 3.21 | 91 |
| 12 | 70 | 30(70Si$_3$N$_4$—30CeN) | — | 1950 | 3 | 9.8 | " | 3.34 | 85 |

*outside the scope of the invention

We claim:

1. A method for the production of a silicon nitride sintered body, which comprises molding a fine powder of an alloy comprising metallic silicon and a metal of the group IIIa of the Periodic Table, subjecting the molded body to a nitriding treatment by calcination in a nitrogen-containing atmosphere and sintering the nitrided molded body at a temperature higher than the nitriding treatment temperature.

2. A method according to claim 1, wherein the fine powder of the alloy contains 70 to 99.9% by weight of metallic silicon and 0.1 to 30% by weight of the metal of the group IIIa of the Periodic Table.

3. A method according to claim 1, wherein the fine powder of the alloy has an average particle size of 0.5 to 10 μm.

4. A method according to claim 1, wherein the nitriding treatment is carried out at a temperature of 1300° to 1400° C.

5. A method according to claim 1, wherein sintering is carried out at a temperature higher than 1650° C.

6. A method according to claim 1, wherein the temperature is elevated subsequently to the nitriding treatment of the molded body and sintering of the molded body is carried out in situ.

7. A method according to claim 1, wherein a sintering aid is added to the fine powder of the alloy in an amount of up to 15% by weight based on the total composition, and the obtained composition is molded.

8. A method for the production of a silicon nitride sintered body, which comprises calcining a fine powder of an alloy comprising metallic silicon and a metal of the group IIIa of the Periodic Table in a nitrogen-containing atmosphere to effect a nitriding treatment, molding the obtained nitride or a mixture of the obtained nitride and a sintering aid, and sintering the molded body at a temperature higher than the nitriding treatment temperature.

9. A method according to claim 8, wherein the fine powder of the alloy contains 70 to 99.9% by weight of metallic silicon and 0.1 to 30% by weight of a metal of the group IIIa of the Periodic Table.

10. A method for the production of a silicon nitride sintered body, which comprises molding a composition comprising (a) 1 to 30% by weight of a fine powder of an alloy comprising metallic silicon and a metal of the group IIIa of the Periodic Table, (b) 70 to 99% by weight of a fine powder of silicon nitride and (c) up to 15% by weight of a sintering aid, and sintering the molded body in a nitrogen-containing atmosphere.

11. A method according to claim 10, wherein the fine powder of the alloy contains metallic silicon and the metal of the group IIIa of the Periodic Table at a weight ratio of from 1/10 to 10/1.

12. A method according to claim 10, wherein sintering is carried out at a temperature higher than 1700° C.

13. A method according to claim 10, wherein sintering is carried out at a temperature of 1300° to 1400° C. and then at a temperature higher than 1700° C.

14. A method for the production of a silicon nitride sintered body, which comprises sintering a composition comprising (i) 1 to 30% by weight of a composite nitride obtained by calcining a powder of an alloy comprising metallic silicon and a metal of the group IIIa of the Periodic Table, (ii) 70 to 99% by weight of a fine powder of silicon nitride and (iii) up to 15% by weight of a sintering aid in a nitrogen-containing atmosphere.

15. A method according to claim 14, wherein the fine powder of the alloy contains metallic silicon and the metal of the group IIIa of the Periodic Table at a weight ratio of from 1/10 to 10/1.

16. A method according to claim 14, wherein sintering is carried out at a temperature higher than 1700° C.

17. A composite nitride which is composed mainly of α-Si$_3$N$_4$ and in which Si and a metal of the group IIIa of the Periodic Table are present at a weight ratio of from 99.9/0.1 to 70/30, said composite nitride being obtained by nitriding a fine powder of an alloy containing metallic silicon and the metal of the group IIIa of the Periodic Table at said weight ratio in a nitrogen atmosphere.

18. A composite nitride as set forth in claim 17, wherein Si and the metal of the group IIIa of the Periodic Table are present at a weight ratio of from 99.5/0.5 to 90/10.

* * * * *